(12) United States Patent
Spura

(10) Patent No.: US 8,996,225 B2
(45) Date of Patent: Mar. 31, 2015

(54) SYSTEM FOR AND METHOD OF CONTROLLING AN UNMANNED VEHICLE

(75) Inventor: Thomas Spura, Endicott, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 1225 days.

(21) Appl. No.: 12/244,016

(22) Filed: Oct. 2, 2008

(65) Prior Publication Data

US 2010/0087980 A1 Apr. 8, 2010

(51) Int. Cl.
*G01C 22/00* (2006.01)
*G05D 1/00* (2006.01)

(52) U.S. Cl.
CPC .................................. *G05D 1/0022* (2013.01)
USPC .......................................................... 701/24

(58) Field of Classification Search
CPC ...................... B64C 2201/00; B64C 2201/141
USPC .......................................................... 701/24
See application file for complete search history.

(56) References Cited

U.S. PATENT DOCUMENTS

| 6,705,573 | B2 | 3/2004 | McDonnell | |
|---|---|---|---|---|
| 6,900,761 | B2 | 5/2005 | Durban et al. | |
| 7,778,744 | B2* | 8/2010 | Rath et al. .......................... | 701/3 |
| 2003/0164794 | A1 | 9/2003 | Haynes et al. | |
| 2005/0027406 | A1 | 2/2005 | Nonami et al. | |
| 2006/0271251 | A1* | 11/2006 | Hopkins .......................... | 701/23 |
| 2007/0021880 | A1* | 1/2007 | Appleby et al. ................ | 701/23 |
| 2007/0284474 | A1* | 12/2007 | Olson et al. ...................... | 244/10 |
| 2008/0215204 | A1* | 9/2008 | Roy et al. .......................... | 701/28 |
| 2010/0082183 | A1* | 4/2010 | Lassini et al. ...................... | 701/2 |

FOREIGN PATENT DOCUMENTS

| CA | 2540269 | 6/2005 |
|---|---|---|
| JP | 2000196768 | 7/2000 |

OTHER PUBLICATIONS

Chris Anderson, The NXT Step—Lego Mindstorms NXT Blog, Nov. 26, 2007, pp. 1-11 Unmanned Aerial Vehicle using Lego Mindstorms NXT remote controller http://thenxtstep.blogspot.com/2007/11/update-for-chris-anderson-uav.html, downloaded Jan. 8, 2009.
The LEGO Group, Mindstorms NXT'REME, Lego Mindstorms Next Mobile Application User Guide, 2006, pp. 1-10.
Sparkfun Electronics, ArduPilot—Arduino Compatible UAV Controller, http://www.sparkfun.com/commerce/product_info.php?products_id=8785, pp. 1-4, downloaded Jan. 8, 2009.

(Continued)

*Primary Examiner* — John Q Nguyen
*Assistant Examiner* — Jordan S Fei
(74) *Attorney, Agent, or Firm* — Michael Best & Friedrich LLP

(57) ABSTRACT

A system and method of controlling an unmanned vehicle. The system includes a base station configured to transmit operational commands and an unmanned vehicle including a cellular communication interface and a controller. The cellular communication interface communicates with the base station through cellular communication. The controller communicates with the communication interface and operates the unmanned vehicle based on operational commands received from the base station.

20 Claims, 7 Drawing Sheets

(56) References Cited

OTHER PUBLICATIONS

DIY Crones, GeoCrawler 4 (Basic Stamp autopilot, Unmanned Aerial Vehicle using LEGO Basic Stamp controller, http:/www.longtail.com/diy_drones/geocrawler_4_basic_stamp_.html, pp. 1-2, downloaded Jan. 8, 2009.

Chris Anderson, GeoCrawler 1 (Lego Autopilot) Instructions; Jun. 12, 2007, http://diydrones.com/profiles/blogs/705844:BlogPost:728, pp. 1-11, downloaded Jan. 8, 2009.

* cited by examiner

SYSTEM FOR AND METHOD OF CONTROLLING AN UNMANNED VEHICLE

FIELD OF THE INVENTION

The invention relates to control of an unmanned vehicle via a communication link.

BACKGROUND

Unmanned vehicles are designed to operate in remote locations and environments that are dull, dirty, or dangerous to humans. These unmanned vehicles are remotely controlled using radio communications. The radio communications require either a line-of-sight (LOS) link between a base unit and the unmanned vehicle or a satellite link between the base unit and the unmanned vehicle. The benefit of unmanned vehicles is reduced due to limitations of the communication links. The LOS link between the base unit and the unmanned vehicle, for example, can be broken and control lost when the unmanned vehicle travels behind an obstacle or over the horizon. Communication over the satellite link is subject to propagation delays and is also adversely affected by bad weather. Therefore, another alternative is desired.

SUMMARY

The invention relates to a system for and method of controlling an unmanned vehicle. Specifically, the system can use cellular communication to control the unmanned vehicle. The method can allow the transfer of operational control of the unmanned vehicle among multiple communication links.

In one embodiment, the invention provides a system for controlling the operation of an unmanned vehicle. The system includes a base station and an unmanned vehicle. The base station is configured to transmit operational commands to the unmanned vehicle. The unmanned vehicle includes a cellular communication interface and a controller. The cellular communication interface is configured to communicate with the base station through cellular communication. The controller is configured to communicate with the communication interface and to operate the unmanned vehicle based on operational commands from the base station.

In another embodiment, the invention provides a method of controlling an unmanned vehicle by a first base station and a second base station. The method includes the acts of establishing a first communication link between the first base station and the unmanned vehicle, providing operational commands to the unmanned vehicle from the first base station via the first communication link, establishing a second communication link between the second base station and the unmanned vehicle, authenticating the second communication link, and transferring operational control of the unmanned vehicle from the first base station to the second base station after authenticating the second communication link.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof herein encompass both direct and indirect mountings, connections, supports, and couplings. Further, "connected" and "coupled" are not restricted to physical or mechanical connections or couplings.

Figure 1:
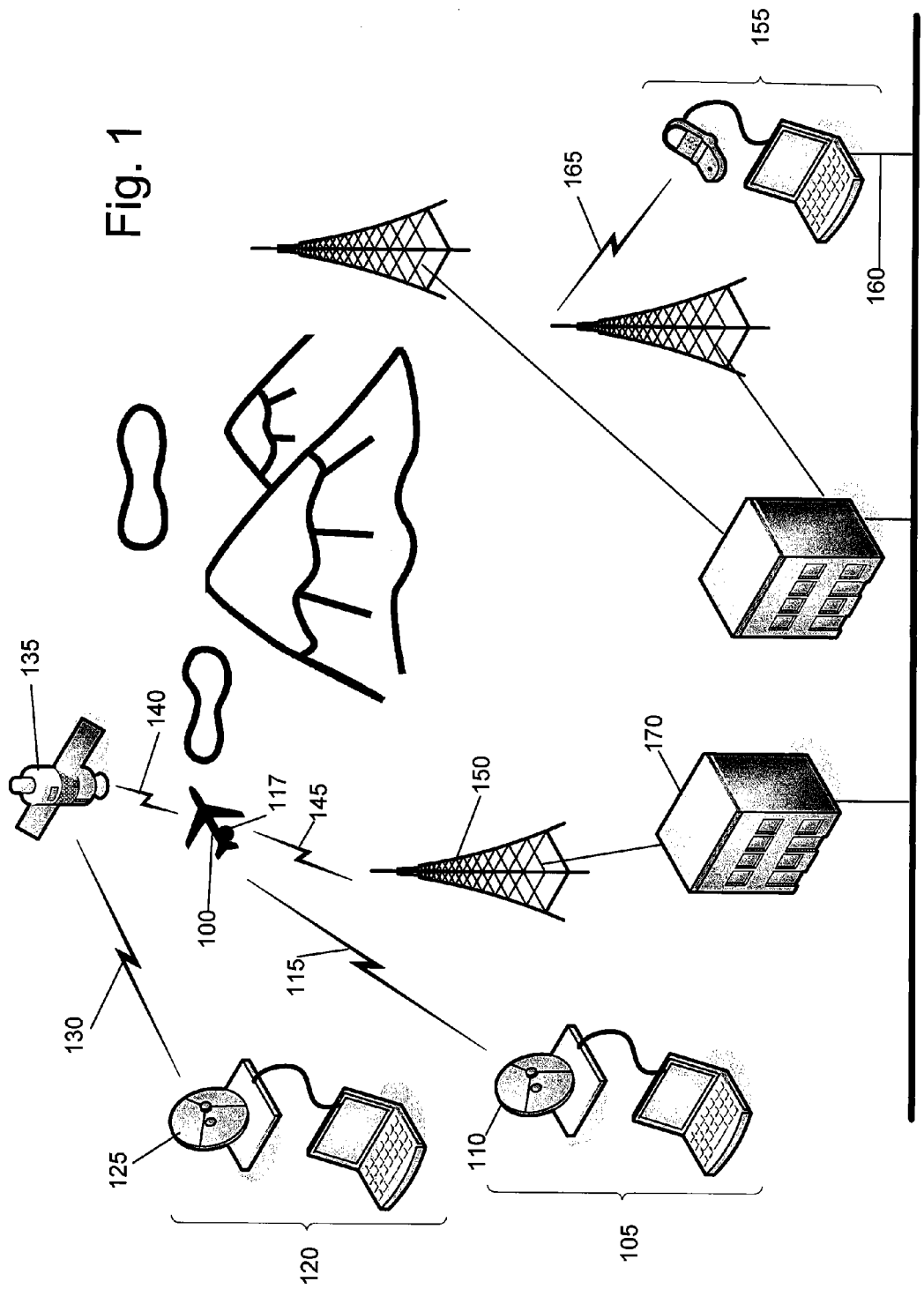
FIG. 1 is a first depiction of communications with an unmanned vehicle.
Figure 2:
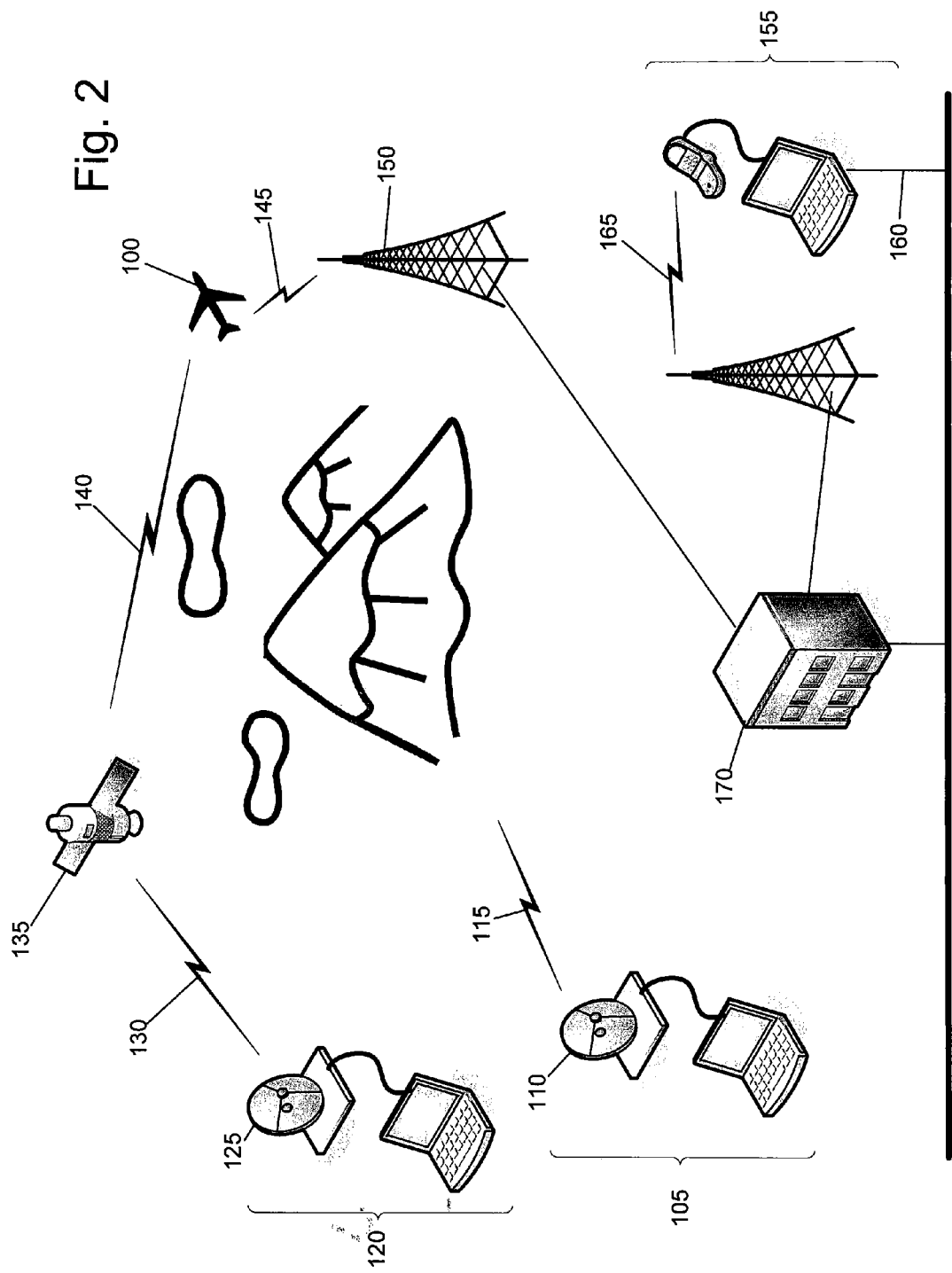
FIG. 2 is a second depiction of communications with an unmanned vehicle.

FIGS. 1 and 2 illustrate a system incorporating an embodiment of the invention. An unmanned vehicle (UV) 100, such as an unmanned K-MAX aerial vehicle manufactured by Kaman Aerospace and Lockheed Martin, operates under the control of a base station 105. The base station 105 includes LOS transmitter/receiver 110. The base station LOS transmitter/receiver 110 establishes a communication link 115 with a LOS transmitter/receiver 117 located at the UV 100. The base station 105 transmits data, including operational commands (e.g., directional commands), to the UV 100. The UV 100 in turn transmits data back to the base station 105. Data transmitted by the UV 100 to the base station 105 includes operational data such as speed, direction, fuel levels, etc.; and mission data such as video streams—visible and/or infrared.

The base station 105 establishes the communication link 115 with the UV 100 prior to operation of the UV 100. During some missions of the UV 100, the base station 105 maintains continuous control of the UV 100 throughout the entire mission. A mission includes a sequence of operational tasks executed by the UV. During other missions, the UV 100 operates independent of the base station 105 for one or more portions of the mission. For example, the base station 105 can control the launching and initial operations (e.g., climbing to a predetermined altitude) of an aerial UV 100. Following the initial operations, the UV 100 can operate based on a task sequence stored in the UV 100. The task sequence can result in the UV 100 traveling to a specific location. During portions of the travel of the UV 100, the UV 100 may be unable to communicate with the base station 105 (e.g., the UV 100 is not in LOS contact with the base station 105). The UV 100 may, upon returning from the stored task sequence, reestablish communication with the base station 105, enabling the base station 105 to take operational control of the UV 100, and control the landing of the UV 100.

In the embodiment shown, the LOS communication link 115 is a radio frequency link operating in the C-band (4 to 8 GHz). The LOS communications link 115 is a direct link between the base station 105 and the UV 100. In some embodiments, one or more indirect communication links can be used to control the operation of and receive data from the UV 100. For example, a second base station 120 can include a 12 to 18 GHz KU-band satellite interface 125. In some embodiments, the base station 105 can include multiple communications interfaces. For example, the base station 105 could include both a LOS communications interface and a satellite interface. In other embodiments, the base station 105 could include multiple interfaces of the same type to provide redundancy in the event of a failure of an interface.

For satellite communication, the second base station 120 establishes a communication link 130 with a satellite 135. The satellite 135 then establishes a communication link 140 with the UV 100. Once the communication links 130 and 140 are established, the satellite 135 acts as a node, relaying or forwarding data from the second base station 120 to the UV 100 and data from the UV 100 to the second base station 120. The communication link 130, satellite 135, and communication link 140 together form a base station-to-UV satellite communication link.

The UV 100 can also include a cellular interface. The cellular interface can establish a cellular communication link 145 with a cellular tower 150. A third base station 155 can establish a communication link with the UV 100 through a landline telephone connection 160 or a cell phone connection 165. The landline connection 160 or cell phone connection 165 then links to a mobile telephone switching office (MTSO) 170. The MTSO 170 locates the cellular tower 150 near the UV 100, and uses the established cellular communication link 145 to communicate with the UV 100. The landline 160 or cellular connection 165, along with the MTSO 170, the cellular communication link 145, and any interim connections form a base station-to-UV cellular communication link.

As shown in FIG. 1, all three communication links, the LOS communication link 115, the base station-to-UV satellite communication link, and the base station-to-UV cellular communication link are able to communicate with the UV 100 when the associated transmitters/receivers 110 or 125, satellites 135, and/or towers 150 have line-of-sight contact with the UV 100. LOS is a direct path between the transmitter/receiver (or tower) and the UV 100 without any intermediary obstacles (e.g., trees, buildings, mountains, etc.). However, both the LOS communication link 115 and the base station-to-UV satellite communication link do not function without LOS contact. This is especially troublesome for the LOS communication link 115. As shown in FIG. 2, should the UV 100 travel to a position where there is no LOS contact between the base station 105 and the UV 100, a far side of a mountain for example, the base station 105 loses its communication link 115 to the UV 100 and can no longer control the UV 100. In such a situation, the UV 100 reverts to a stored operational sequence and operates independently.

The above problem exists to a lesser extent for the base station-to-UV satellite communication link. For the base station-to-UV satellite communication link, LOS contact is required for both the base station 120 to satellite 135 communication link 130 and for the satellite 135 to UV 100 communication link 140.

There are multiple satellites 135 in orbit around the earth. If an obstacle prevents LOS contact between the base station 120 and one satellite 135, there might be a second satellite 135 with which the base station 120 has LOS contact. The base station 120 then establishes an alternate communication link 130 with the second satellite 135. The direct LOS communication link 115 between the base station 105 and the UV 100, however, does not have the ability to establish an alternate communication link, and loses the communication link 115 when an obstacle prevents LOS contact.

In addition, the satellite 135 is positioned a substantial distance above the ground, and therefore has LOS contact over a significantly larger area than the ground based base station 105 (in some embodiments, the base station 105 may be located in the air, such as in an Airborne Early Warning and Control System (AWACS) plane, providing the base station 105 with a larger LOS contact area). This is especially true for aerial UVs which fly above many obstacles (e.g., trees). However, ground based UVs may have obstacles above them (e.g., trees), reducing the area in which a satellite 135 can have LOS contact with the UV 100. Communication via satellites 135 is also subject to propagation delays and can be adversely affected by certain weather conditions (e.g., heavy rain or snow) resulting in interrupted communications and loss of control.

A base station-to-UV cellular communication link does not require LOS contact between the base station 155 and the UV 100. This enables control over a greater area and in environments that have many obstacles, enabling base station-to-UV cellular communication links to control ground based UVs operating in forested areas. In addition, propagation delays are relatively small for base station-to-UV cellular communication links, enabling more accurate control of the UV 100 from the base station 155.

Figure 3:
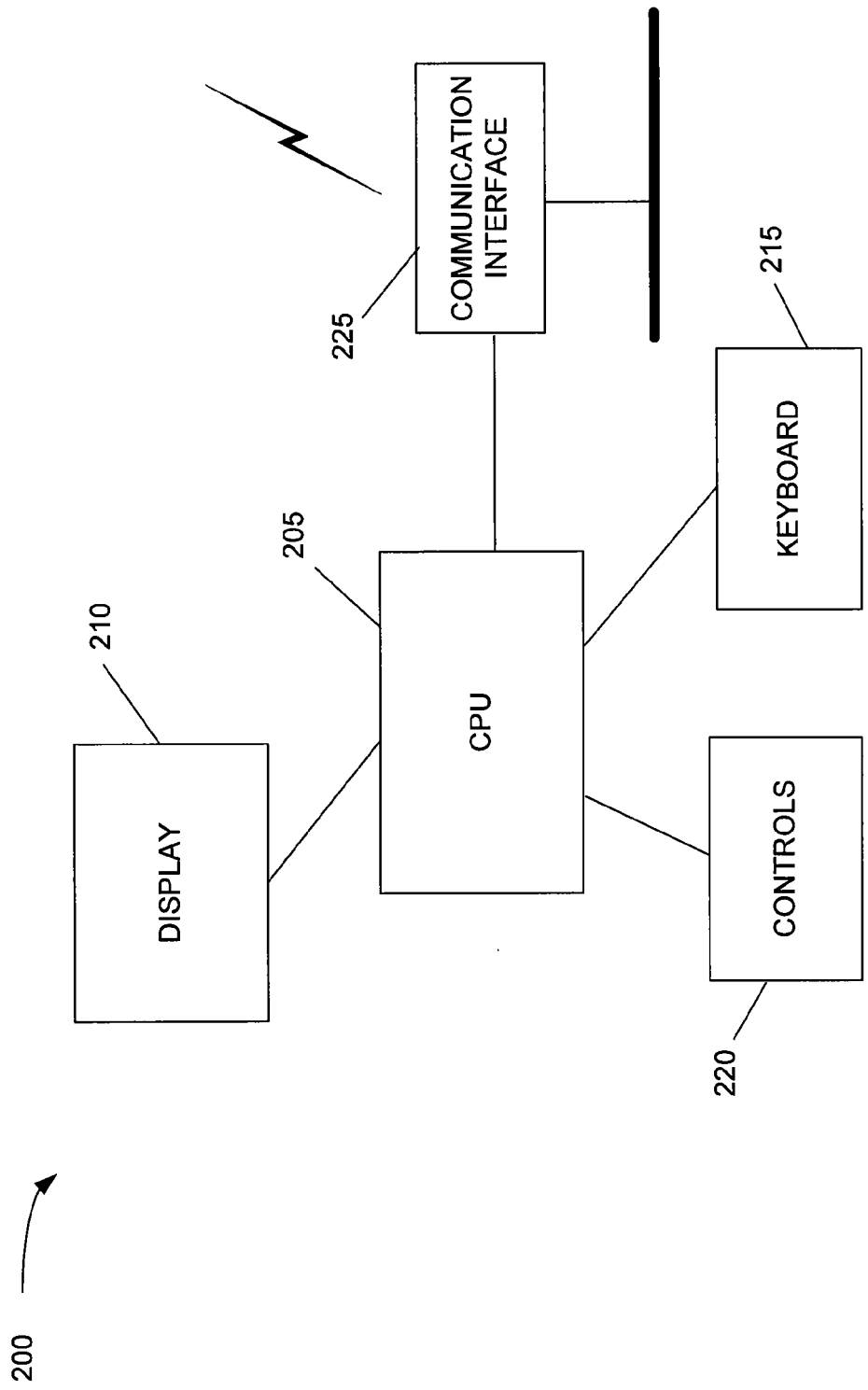
FIG. 3 is a block diagram of an exemplary construction of a base station's internal architecture.

FIG. 3 illustrates a block diagram of an exemplary architecture 200 of a base station. The architecture 200 includes a central processing unit (CPU) 205, one or more displays 210, a keyboard 215, one or more controls 220, and one or more communication interfaces 225. In some embodiments, waypoint information (e.g., GPS coordinates, altitudes, etc.) is input into the control 220. The CPU 205 detects the waypoint information and sends operational commands, based on the waypoint information, to the UV 100 via the communication interface 225. In other embodiments, the controls 220 include one or more joystick(s). An operator controls the operation of the UV 100 by moving the joystick(s). The CPU 205 detects the movement of the joystick(s) 220 and sends operational commands, based on the movement, to the UV 100 via the communication interface 225.

The communication interface 225 also receives data (e.g., speed, position, altitude) from the UV 100 and relays the data to the CPU 205. The CPU displays the data received from the UV 100 on the display(s) 210. The communication interface 225 interfaces the CPU 205 to a specific type of communication link for a particular base station. For example, the communication interface 225 is a C-band transmitter/receiver 110 for the base station 105, a KU-band transmitter/receiver 125 for the base station 120, and a cellular or land-line transmitter/receiver for the base station 155.

Figure 4:
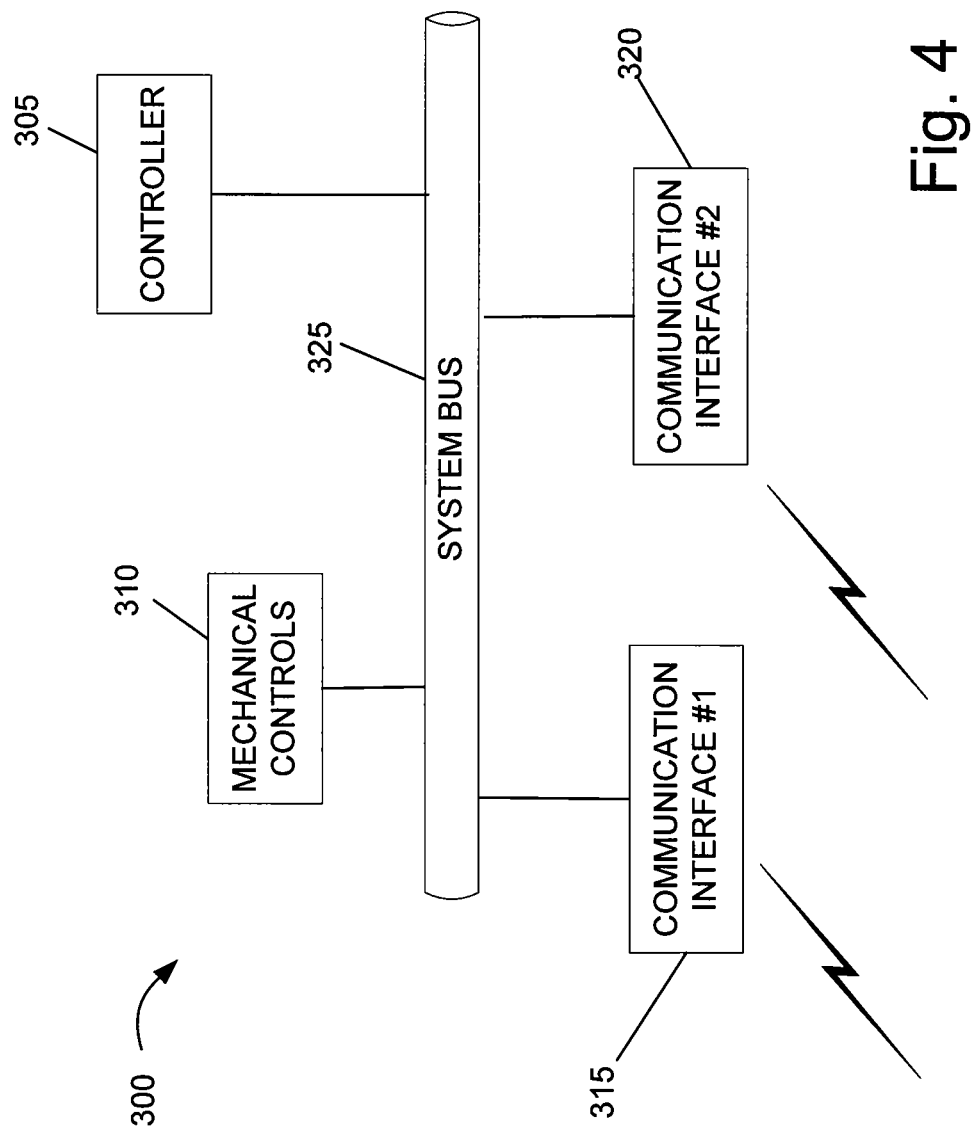
FIG. 4 is a block diagram of an exemplary construction of an unmanned vehicle's internal communication architecture.

FIG. 4 illustrates a block diagram of an exemplary construction of a control structure 300 for a UV. The control structure 300 includes a controller 305, a mechanical control system 310, a first communications interface 315, and a second communications interface 320. The various elements of the control structure 300 communicate with one another over a system bus 325. Additional elements can reside on and communicate over the system bus 325 as well, such as a video camera, infrared camera, radar, sensors, Global Positioning System (GPS), additional communication interfaces, etc. In some constructions, the elements (e.g., the controller 305 and the communication interfaces 315 and 320) can be hardwired together instead of using a system bus.

In some embodiments, communication between a base station and a UV, regardless of the type of communication link, uses a tactical data link that incorporates authentication and encryption. Each packet of communicated data includes authenticating data and is encrypted by the sending device. The receiving device decrypts the data and verifies the authenticating data before accepting the data. When data is received, by either the base station or UV, that cannot be authenticated, the data is ignored. In the case of a cellular link, the UV may sever the communication link (i.e., "hang-up") if unauthenticatable data is received, requiring a new communication link to be established.

Figure 5:
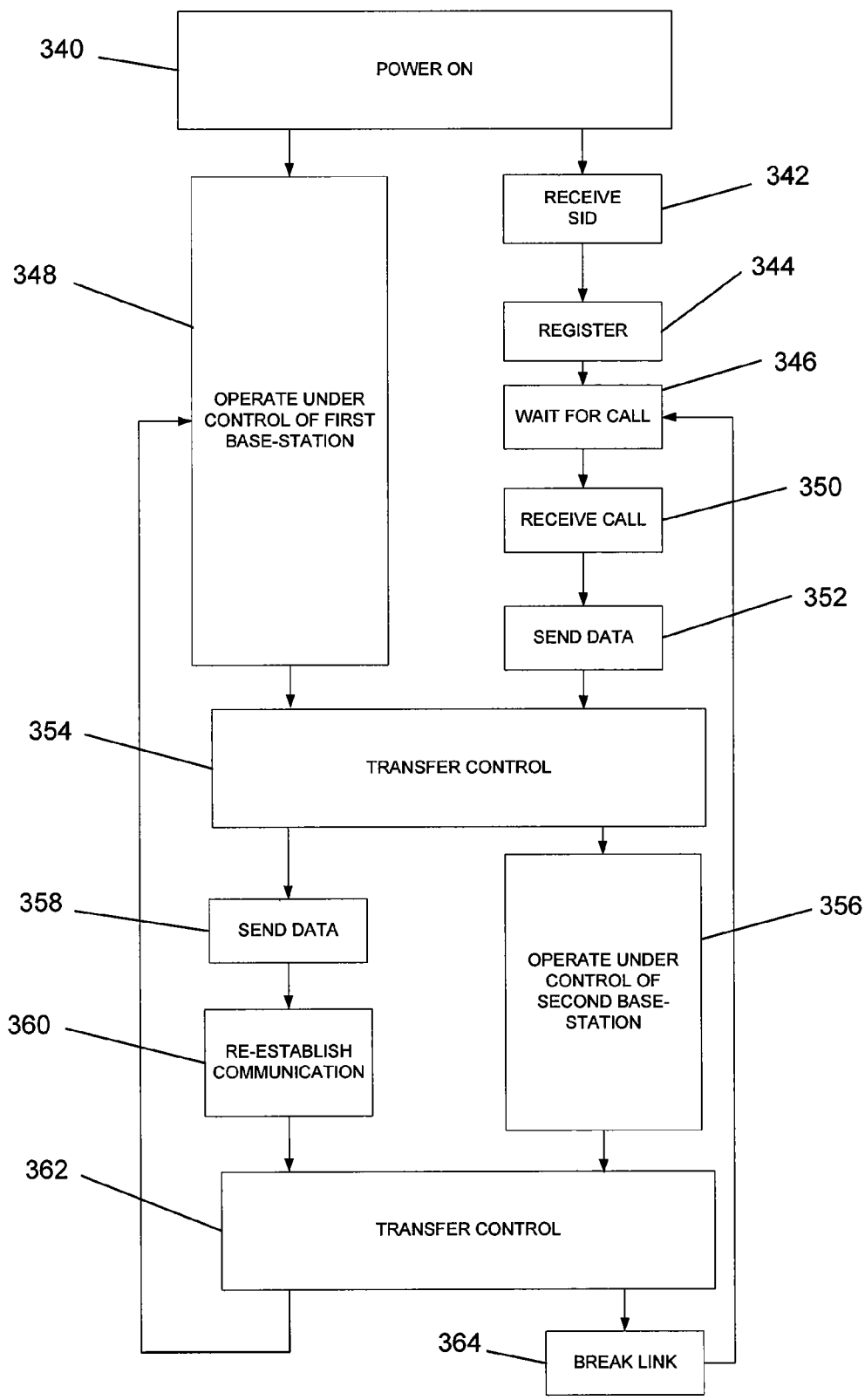
FIG. 5 is a flow chart of the operation of an unmanned vehicle wherein operational control of the unmanned vehicle is transferred from a first base station to a second base station and back again.

FIG. 5 is a flow chart of the operation of an exemplary embodiment of the UV 100. In the embodiment shown, the first communication interface 315 is a LOS communication interface and the second communication interface 320 is a cellular communication interface. The UV 100 powers up (step 340) and the cellular interface 320 operates much the same as a cellular phone. The cellular interface 320 listens for a system identification code (SID) (step 342) from one or more cellular towers located in the vicinity of the UV 100. Upon detecting a SID, the cellular interface "registers" with the cellular tower (step 344) and waits for a call (step 346). Registering with the cellular tower enables the cellular system to locate the cellular interface 320, and thus the UV 100, should a "call" be initiated to the cellular interface 320. The cellular interface 320 is compatible with cellular interfaces including analog, digital, Code Division Multiple Access (CDMA), etc. As used herein, a cellular phone or device (also called a mobile, wireless, or cell phone or device) is a short-range, portable electronic phone or device used for mobile voice or data communication within a network of cellular communication towers. Each cellular tower constitutes a "cell" of the network. As the UV 100 moves between "cells," the cellular towers monitor the signal strength from the cellular interface 320, passing the communication link 165 from a cellular tower having detecting a declining signal strength to a cellular tower detecting an increasing signal strength.

In some embodiments, e.g., for an aerial UV, it may be desirable to launch the UV 100 using the base station 105 located where an operator can see the UV 100. Control of the UV 100 is then transferred to the remote base station 155 at some point after the launch. In this embodiment, an operator at the base station 105 uses the LOS communications link 115 to operate the UV 100, including, for example, launching the UV 100 (step 348). Once the UV 100 has been launched, and perhaps traveled a distance, the remote base station 155 can "take over" operation of the UV 100. The remote base station 155 places a "call" to the cellular interface 320 (or in the alternative, the cellular interface 320 "calls" the base station 155). The remote base station 155 can place the call to the cellular interface in various manners such as a cellular call (e.g., via cellular link 165), a landline call, or other suitable manners. In the embodiment shown, the communication interface 320 receives the call (step 350), and the base station 155 links to the MTSO 170 and the cellular tower 150 where the UV 100 is located and to the cellular interface 145 to complete the call. The remote base station 155 then communicates with the UV 100 via the base station-to-UV cellular link (step 352).

The UV 100 may continue to receive commands from the first base station 105 after the base station-to-UV cellular link is established with the third base station 155. Transfer of control from the first base station 105 to the third base station 155 can be accomplished as the result of, for example, a command from the third base station 155 to the UV 100 to take control, a command from the first base station 105 to relinquish control, a "count-down" provided by the UV 100 (e.g., displayed at both the first base station 105 and the third base station 155), or other suitable manners for transferring control. The transfer of control can allow an operator at the third base station 155 to "get his bearings" before having to actually operate the UV 100. At step 354, control is transferred to the third base station 155 and the third base station 155 begins controlling the UV 100 (step 356). Even after control has been transferred to the third base station 155, the UV 100 can continue to send data back to the first base station 105 (step 358) to enable personnel at the first base station 105 to monitor the mission. The data that is transferred to the first base station 105 can be the same as or can be different from the data that is transmitted to the controlling third base station 155. The communication link 115 to the first base station 105 may be interrupted during the mission if the UV 100 no longer has LOS contact with the first base station 105 transmitter/receiver 110.

At the end of the mission, a reverse transfer can occur to transfer control back to the first base station 105 to facilitate landing of the UV 100. The UV 100 reestablishes communication with the first base station 105 (step 360) and transfers control (step 362) back to the first base station 105. The communication interface 320 then breaks the link (e.g., hangs up) to the third base station 155 (step 364).

For some missions and in some embodiments, the remote base station 155 may be able to operate the UV 100 continuously throughout the entire mission, taking control of the UV 100 from the start of the mission until the end without the need to transfer control between multiple base stations.

Figure 6:
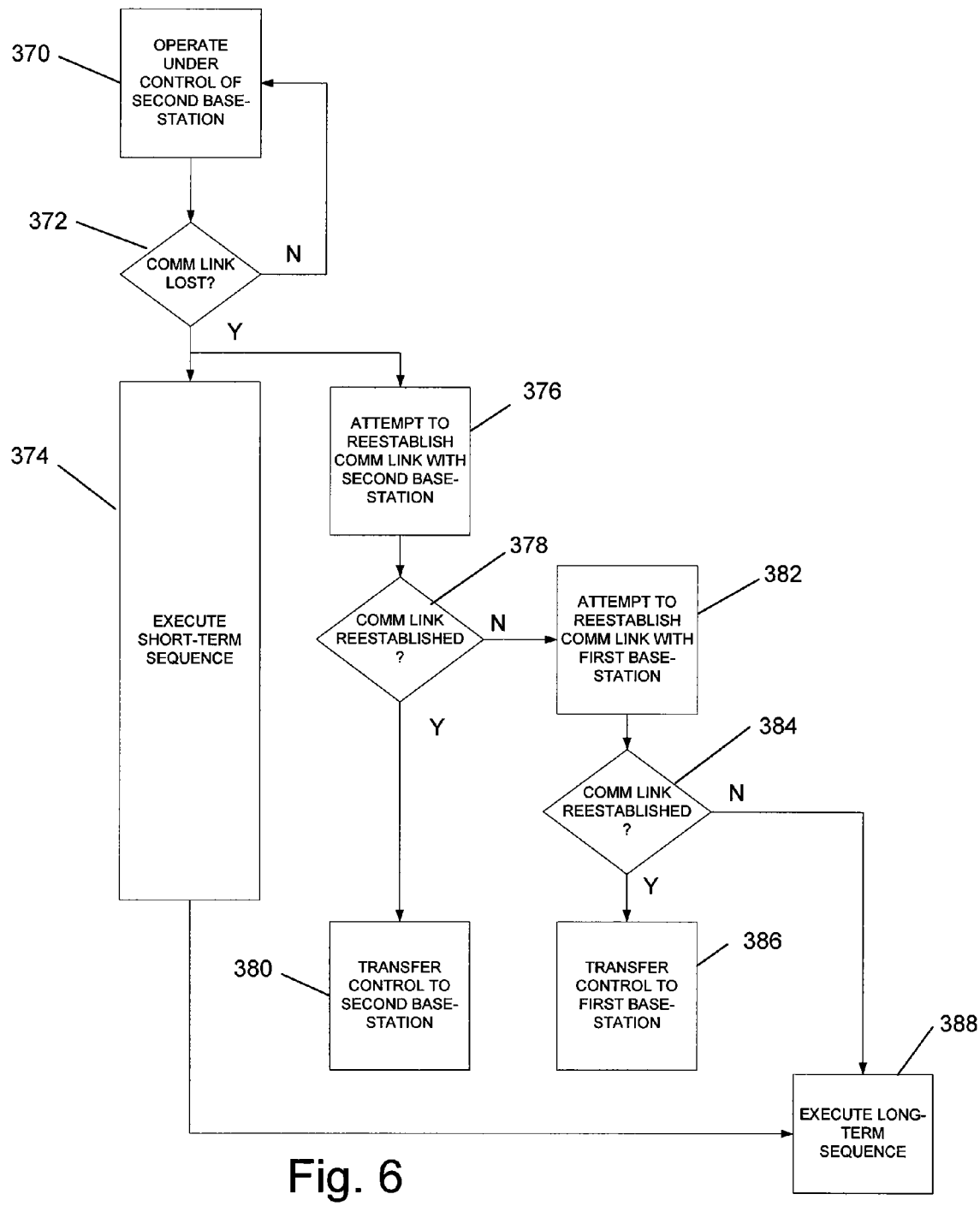
FIG. 6 is a flow chart of the operation of an unmanned vehicle following the loss of a communication link to a controlling base station.

A UV 100 that is being controlled via a base station-to-UV cellular link is susceptible to a break in the cellular link 145, e.g., because of a dropped call (out of range of the cellular towers), jamming of the cellular signal, or another type of communications break. FIG. 6 is a flow chart illustrating an embodiment of the operation of the UV 100 when the base station-to-UV cellular link is lost. At step 370, the UV 100 is operating under the control of the third base station 155.

If the base station-to-UV cellular link is lost while the third base station 155 is controlling the UV 100 (step 372), the UV 100 can execute a sequence of stored tasks (e.g., reduce altitude, follow a specific mission sequence). The stored tasks can include short-term and long-term sequences. The UV 100 can follow a short-term sequence (step 374) as the UV 100 attempts to reestablish communication with a base station. Alternatively, a long-term sequence can be implemented immediately upon the cellular link 145 being lost. The long-term sequence can be a "return to base" sequence or a sequence that executes the remainder of the mission (or a different mission). When the base station-to-UV cellular link is lost, the UV 100 and/or the third base station 155 can attempt to reestablish the base station-to-UV cellular link (step 376). For example the third base station 155 can "call" the UV 100 or the UV 100 can "call" the third base station 155. At step 378, the UV 100 determines if the base station-to-UV cellular link is reestablished. If it is reestablished, the UV 100 again operates under control of the third base station 155 (step 380). If the UV 100 is unable to reestablish the base station-to-UV cellular link (step 378), the UV 100 attempts to reestablish the LOS communication link 115 with the first base station 105 (step 382). If the UV 100 is able to establish the LOS communication link 115 (step 384), the UV 100 transfers control to the first base station 105, and operates under control of the first base station 105 (step 386). If the UV 100 is unable to establish the LOS communication link 115, the UV 100 executes the long-term sequence as described above (step 388).

Figure 7:
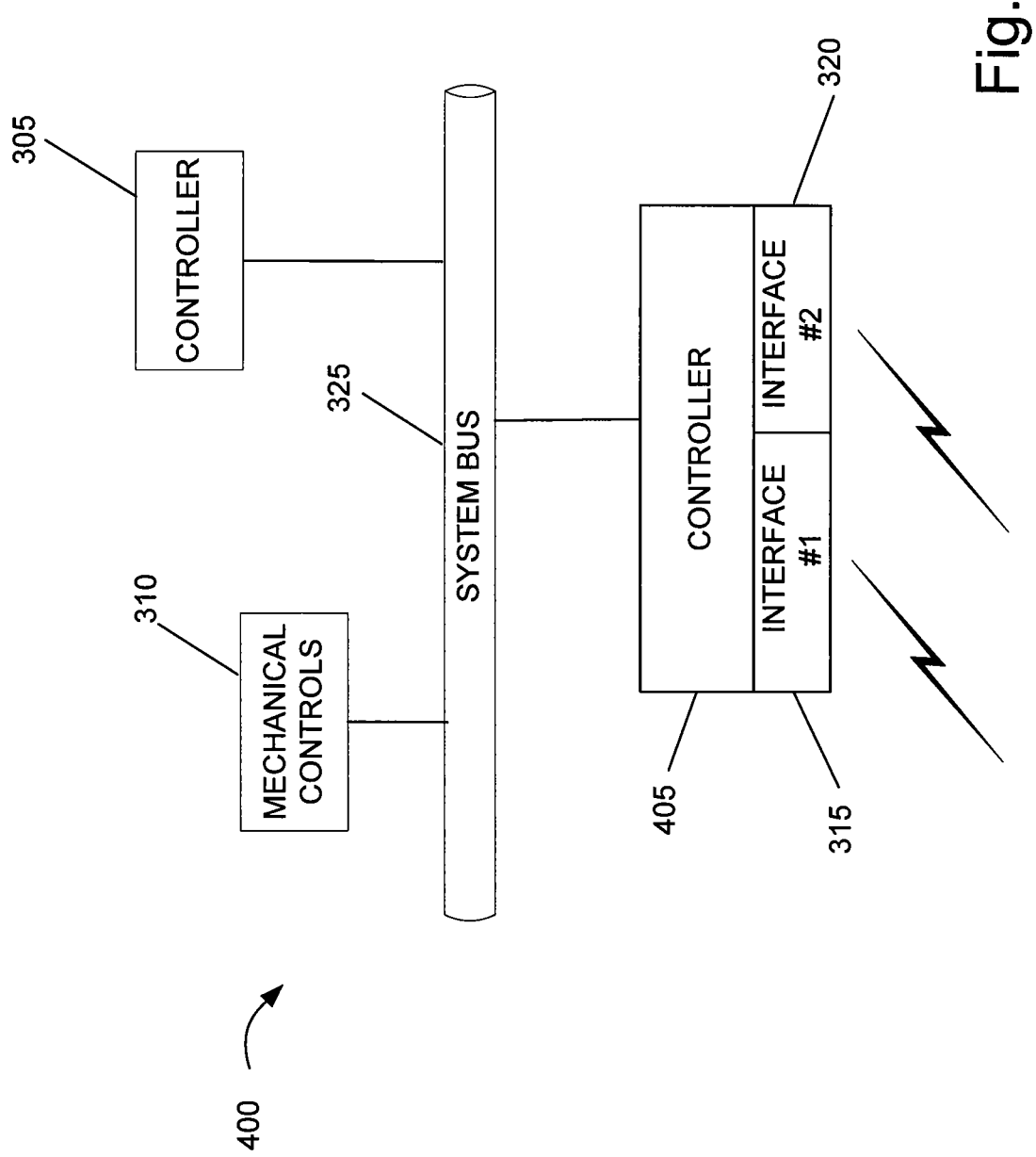
FIG. 7 is a block diagram of an alternative construction of an unmanned vehicle's internal communication.

FIG. 7 illustrates an alternative construction of a structure 400 of the UV 100. The structure 400 is the same as the structure 300 shown in FIG. 4 except that there is an additional communications controller 405. The communications controller 405 is coupled to the first communication interface 315 and the second communication interface 320 and controls the communications functions including authentication, encryption, data transmission and reception, and transfer of control. The communication controller 405 thus reduces the processing load of the controller 305.

Various features and advantages of the invention are set forth in the following claims.

What is claimed is:

1. A system configured to control the operation of an unmanned vehicle, comprising:
    a base station configured to transmit operational commands via line of sight communication; and
    an unmanned vehicle including
        a first communication interface, the first communication interface being a line of sight communication interface,
        a second communication interface, the second communication interface being a cellular communication interface configured to communicate with the base station through cellular communication,
        a bus coupled to the first communication interface and the second communication interface, and
        a controller configured
            to communicate with the first communication interface and the second communication interface via the bus,
            to operate the unmanned vehicle based on operational commands received from the base station via the line of sight communication,
            to transfer total operational control of the unmanned vehicle between the first communication interface and the second communication interface; and
            to operate the unmanned vehicle based on operational commands received via the cellular communication,
        wherein total operational control of the unmanned vehicle is transferred between the first communication interface and the second communication interface during operation of the unmanned vehicle such that during a single mission, the unmanned vehicle is initially operated based on commands received from the base station via one of the line of sight communication and the cellular communication and is subsequently operated based on operational commands received via the other of the line of sight communication and the cellular communication.

2. The system of claim 1, wherein the base station is configured to communicate with the unmanned vehicle when there is no line-of-sight contact between the base station and the unmanned vehicle.

3. The system of claim 1, wherein the base station has a communication link to the unmanned vehicle via at least one of a land-line telephone connection and a cellular telephone connection.

4. The system of claim 1, wherein the cellular communication interface is further configured to communicate with a plurality of cellular towers.

5. The system of claim 2, wherein the base station is further configured to call the unmanned vehicle to create a communications link with the unmanned vehicle.

6. The system of claim 1, further comprising a second base station and a second communication interface configured to communicate with the second base station when the second communication interface has line-of-sight contact with the second base station.

7. The system of claim 6, wherein the second communication interface is a C-Band communication interface.

8. The system of claim 6, wherein the unmanned vehicle is configured to transfer operational control from the second base station to the base station.

9. The system of claim 8, wherein the controller is further configured to provide operational and mission data to the base station and the second base station after transferring operational control to the base station.

10. The system of claim 9, wherein the mission data includes a video stream.

11. The system of claim 8, wherein the controller is further configured to attempt to establish communication with the second base station if the communication link to the base station is interrupted.

12. The system of claim 11, wherein the controller is further configured to execute a stored operational sequence if communication cannot be reestablished with the base station or the second base station.

13. The system of claim 1, wherein the base station is further configured to communicate with the unmanned vehicle using a tactical data link, the tactical data link being encrypted and providing authentication of the source of the communication.

14. The system of claim 1, wherein the unmanned vehicle includes an unmanned aerial vehicle.

15. The system of claim 1, wherein the controller is further configured to attempt to reestablish communication with the base station following an interruption of the communication link.

16. A method of controlling an unmanned vehicle by a first base station and a second base station, the method comprising:
    establishing a first communication link, the first communication link being a line of sight communication link, between the first base station and a first communication interface of the unmanned vehicle;
    providing operational commands to the unmanned vehicle from the first base station via the first communication link;
    establishing a second communication link, the second communication link being a cellular communication link, between the second base station and a second communication interface of the unmanned vehicle;
    authenticating the second communication link; and
    transferring total operational control of the unmanned vehicle, in a controller of the unmanned vehicle, from the first communication link to the second communication link after authenticating the second communication link while the unmanned vehicle is executing a mission.

17. The method of claim 16, wherein the second communication link includes a cellular link.

18. The method of claim 16, further comprising transmitting data to the first base station and the second base station after transferring operational control to the second base station.

19. The method of claim 16, further comprising reestablishing the second communications link following a break in the second communications link.

20. The method of claim 19, further comprising reestablishing the first communications link if the reestablishing the second communications link fails, and executing a stored operational sequence if the reestablishing the first communications link fails.

\* \* \* \* \*